United States Patent [19]

Wijntjes et al.

[11] Patent Number: 4,711,573
[45] Date of Patent: Dec. 8, 1987

[54] DYNAMIC MIRROR ALIGNMENT CONTROL

[75] Inventors: Geert Wijntjes, Belmont; Michael Hercher, Marblehead, both of Mass.

[73] Assignee: Beckman Instruments, Inc., Fullerton, Calif.

[21] Appl. No.: 940,196

[22] Filed: Dec. 12, 1986

Related U.S. Application Data

[63] Continuation of Ser. No. 472,771, Mar. 5, 1983, abandoned.

[51] Int. Cl.$^4$ ............................................. G01J 3/45
[52] U.S. Cl. .................................. 356/346; 318/640; 356/349; 356/351
[58] Field of Search ............... 356/346, 349, 351, 363; 318/640

[56] References Cited

U.S. PATENT DOCUMENTS 4,053,231 10/1977 Fletcher et al. ................. 356/346 X
4,444,501  4/1984 Schwiesow .......................... 356/346

Primary Examiner—Davis L. Willis
Assistant Examiner—Matthew W. Koren
Attorney, Agent, or Firm—William H. May; P. R. Harder; Steven R. Markl

[57] ABSTRACT

An improved mirror alignment control for dynamically aligning the reflecting mirrors bounding the optical path in an interferometer comprises a closed loop servo control which utilizes a two frequency laser beam to provide phase comparison between beams traversing differing portions of the optical paths in the interferometer to determine alignment of the mirrors, said phase comparison providing a correction signal to direct multi-axial alignment of at least one of the mirrors.

12 Claims, 3 Drawing Figures

DYNAMIC MIRROR ALIGNMENT CONTROL

This is a continuation, of application Ser. No. 472,771, filed Mar. 5, 1983, now abandoned.

FIELD OF THE INVENTION

The present invention pertains to spectrophotometric instrumentation, and in particular to Fourier transform infrared spectrophotometers utilizing a interferometer and a laser to obtain spectral data.

BACKGROUND OF THE INVENTION

The FT-IR spectrophotometer consists of two basic parts: (1) an optical system which includes the interferometer and (2) a dedicated computer used to analyze the information contained in the light beam produced. The advantages and improved performance of a Fourier transform infrared (FT-IR) spectrophotometer result from the use of an interferometer, rather than a grating or prism, to obtain spectral data (FT-IR). An interferometer permits measurement of the entire spectral range of a sample in a fraction of the time previously required.

The operation of a Michelson interferometer to analyze infrared light which passes through a sample, as applied to FT-IR spectrophotometry, is well known. The interferometer consists of a pair of perpendicularly arranged optical paths, each having a reflector or mirror positioned at its end to reflect light traversing the path. One mirror is fixed. The other mirror is longitudinally movable to increase or decrease the length of the light path. A light beam entering the interferometer is split into two components by a beam splitter so that a separate component of the beam will traverse each optical path. After reflection the components are recombined at the beam splitter to constructively and destructively interfere. The reconstructed beam is thereafter directed through a sample and focused onto a photodetector for measurement of intensity.

The intensity of the reconstructed wave depends on the difference in length of the optical paths over which the component beams travel. Generally, when the movable mirror is scanned at a constant velocity, the intensity of an emerging light beam will modulate in a regular sinusoidal manner for any selected wavelength of light passing through the interferometer.

A typical infrared light beam leaving the interferometer is a complex mixture of modulation frequencies due to its polychromatic nature. After the infrared light beam has passed through a sample material, it can be detected to determine those wavelengths of light which have been absorbed by the sample. This is accomplished by measuring change in the sinusoidal pattern expected when the light beam exits the interferometer. Measurement of the differences in the characteristic sinusoidal pattern for each light wavelength indicates those wavelengths of light which are absorbed by the sample. Infrared light absorbance characteristics provide a spectrum from which the material comprising the sample can be determined.

The output of a detector measuring the intensity modulation of the emerging beam can be recorded at very precise intervals during a mirror scan, to produce a plot known as an interferogram. The interferogram is a record of the output signal produced by the infrared detector as a function of the different length optical paths traversed by the components of the infrared beam in the interferometer. Successive measurements of the sample are obtained and co-added to obtain an average interferogram having improved signal-to-noise characteristics. The average interferogram provides information and data relating to the spectral characteristics of the sample material. After mathematical preparation, a Fourier transform calculation is performed on the interferogram to obtain a spectral fingerprint of the sample composition. The results are compared against known reference data to determine the composition of the sample.

Most Fourier transform techniques require averaging of a large number of interferograms in order to obtain accurate results. As many as 32 to 50 scans during which measurements are taken may be averaged. It is important for an interferogram to be precisely reproducible in order to maintain accuracy in their averaging. Since an interferogram is created by measurement intensity modulation, more accuracy in the interferogram and resultant Fourier transformation will also result if more accuracy is obtained in the measurement of intensity throughout the time during which data points are measured to define the interferogram.

To accomplish accuracy and reproducibility for an interferogram, an adjustable mirror bounding the fixed path of the interferometer must be maintained in optimal alignment with the beam splitter and the moving mirror. This is most often accomplished by providing a biaxial adjustment for the fixed mirror so that it may be adjusted about two axes to bring the image of its surface into absolute parallel alignment with the reflecting surface of the moving mirror. It is extremely important that the image of the adjustable mirror be maintained parallel to the reflecting surface of the moving mirror. Parallelism must be maintained within one wavelength of the shortest wavelength of light being measured to generate the interferogram. Failure to provide precise alignment results in reduction of the magnitude of identifying peaks in the interferogram produced, reduction in signal-to-noise performance and phase error introduction in the heterodyne beam leaving the interferometer. Each of these substantially reduces the accuracy with which an interferogram can be reproduced and the precision with which the interferogram can be analyzed to determine the sample composition. The accuracy with which a spectrophotometer measures intensity modulation can be no better than the limited precision of its components. The molecular geometries cannot be accurately determined if the modulation frequencies are not reproduced and measured precisely.

Prior art designs have used massive structures and extremely fine mechanical adjustments to obtain accurate mirror alignment. Temperature compensation has also been attempted to reduce thermal distortion error. However, it has been found that static alignment cannot assure accurate mirror alignment throughout a scan of a moving mirror. Wobble and support inaccuracies of the moving mirror continue to introduce alignment error. Dynamic mirror misalignment results in aperiodic errors in the intensity measurements obtained, which generate unpredictable and accuracy-reducing gliches in the interferogram profile.

Modern systems accomplish mirror alignment automatically by passing a reference light beam, such as a laser beam, concurrently through the interferometer with the infrared light. The reference beam is used to directly measure misalignment between the fixed and movable mirrors.

Laser beams have been used most effectively. Since a laser beam undergoes the same splitting and traverse of changing optical paths as the infrared light in the interferometer, the recombined laser beam exhibits a measurable monochromatic wavelength having an interference pattern containing information indicative of mirror alignment. A phase difference measurement may be obtained across the width of the laser beam to determine the difference in the length of the path traversed by one portion of the beam relative to another. Unequal phase measurements are indicative of unequal path lengths indicating mirror misalignment.

In a conventional system, when the movable mirror is moving at a constant velocity, a doppler shift is generated in the component of the laser beam traversing the changing optical path. When the doppler shifted beam is recombined with the component traversing the fixed length path, a modulated frequency beam exhibiting measurable beat frequency is produced. The recombined beam yields a series of varying intensity or fringe patterns which may be analyzed across the cross section of the beam to determine mirror alignment. Conventional systems generally drive the moving mirror at a velocity which produces a 5 KHz modulation, i.e., doppler shift, in the exiting beam. At faster mirror velocities, the modulation will increase providing increased resolution for alignment measurement, while at slower mirror velocities the modulation will decrease. Precision with this technique can be maintained to approximately one cycle in 5,000.

In a conventional system, however, a movable mirror must be scanning to obtain a doppler shift in the light beam traversing its path, and thus a measurable modulation signal. When the movable mirror is stationary, the light beams traveling along adjacent paths of the interferometer are combined to form an identical frequency light beam without modulation. Thus when the mirror is not moving, there is no information obtained in the recombined beam which can be used to determine mirror alignment. This occurs at every instance that the movable mirror reaches the end of its scan and stops before turning around to proceed in the other direction. With prior art auto-alignment systems mirror alignment is lost at the ends of mirror scan.

Furthermore, with conventional systems modulation of the recombined beam becomes very difficult to measure as the velocity of a mirror scan becomes very slow. For instance, for a 0.3 centimeter per second scan velocity, a modulation frequency of 5 KHz is obtained in the recombined light beam. However, if the mirror is driven at a scan velocity of 0.03 centimeters per second, the modulation frequency is reduced to 0.5 KHz. Thus, as the scan velocity is decreased, the modulation frequency in the recombined light beam decreased to a level which is difficult to measure with modern electronic detectors, providing no control of alignment.

An FT-IR spectrophotometer has limited resolution for frequency measurement determined by its limited ability to produce an interferogram. The the optical system is fundamental in determining the accuracy with which a spectrophotometer can measure frequencies. The accuracy with which the spectrophotometer can analyze a sample is directly related to the ability of the instrument to produce an accurate measure of intensity of the emerging infrared beam. This requires proper alignment of the fixed and movable mirrors.

Conventional use of a laser reference to obtain mirror alignment continues to suffer limited precision and control ability. Improvements in the precision with which mirror alignment can be measured and controlled will necessarily produce significant improvement in the accuracy which an FT-IR spectrophotometer can analyze a sample substance.

SUMMARY OF THE INVENTION

The present invention comprises improved mirror alignment control for dynamically aligning the image of the mirror bounding the fixed length optical path in the interferometer, with the reflecting surface of the movable mirror bounding the second optical path. The invention utilizes a laser which generates a laser beam having two component frequencies which when heterodyned produce a constant beat frequency. A closed loop servo control provides constant alignment control in response to a comparison of the phase difference exhibited across the cross section of the laser beam leaving the interferometer. The dynamic mirror alignment control obtains precise stable mirror control through analysis of heterodyne frequency modulation.

A laser beam having two components of slightly differing frequency is obtained by applying a magnetic field to a helium-neon gas laser. This phenomenon is well known and described as the Zeeman effect. The laser beam having differing frequency components is directed through the interferometer. Each component of the beam is combined with its opposing component after traversing the optical paths of the interferometer. The combined heterodyne beam exhibits a continual modulation or beat frequency equal to the difference frequency of the component, plus any doppler-affected change in frequency caused when the movable mirror is scanning. The continually displayed modulation frequency of the heterodyne beam provides continuous information indicating precision of alignment between the fixed and movable mirrors.

A detector array is provided to obtain phase detection at various points throughout the cross section of the laser beam leaving the interferometer. Individual measurements are compared with an average of the phase measurements obtained to generate correction signals to obtain precise mirror alignment.

A triad of piezoelectric elements which longitudinally respond to applied voltage are used to mount the fixed mirror in the interferometer. The corrective signals obtained through phase comparison of the cross section of the exiting laser beam are applied to the piezoelements to obtain bidirectional correction of mirror alignment.

Due to the advantageous use of the two-frequency laser which yields a continually modulated beam emerging from the interferometer, the alignment of the mirrors can be continually controlled throughout the scan range of the movable mirror and even when the mirror is stationary. Thus, mirror alignment is never lost when the movable mirror changes scan direction.

Dynamic mirror alignment control can maintain constant mirror alignment along the entire range of scan in either direction without conversion circuitry. Advantageously this may allow samples to be accurately obtained in both forward and rearward scans of the mirror, and throughout the scan range, substantially reducing the time required to take sufficient data for accurate averaging techniques. The increased resolution in obtaining interferogram data with this system yields more rapid and accurate analysis of the sample material.

Furthermore, due to the continuous information signal provided by the system, it is unnecessary to perform frequent alignment calibrations.

BEST MODE OF THE INVENTION

Figure 1:
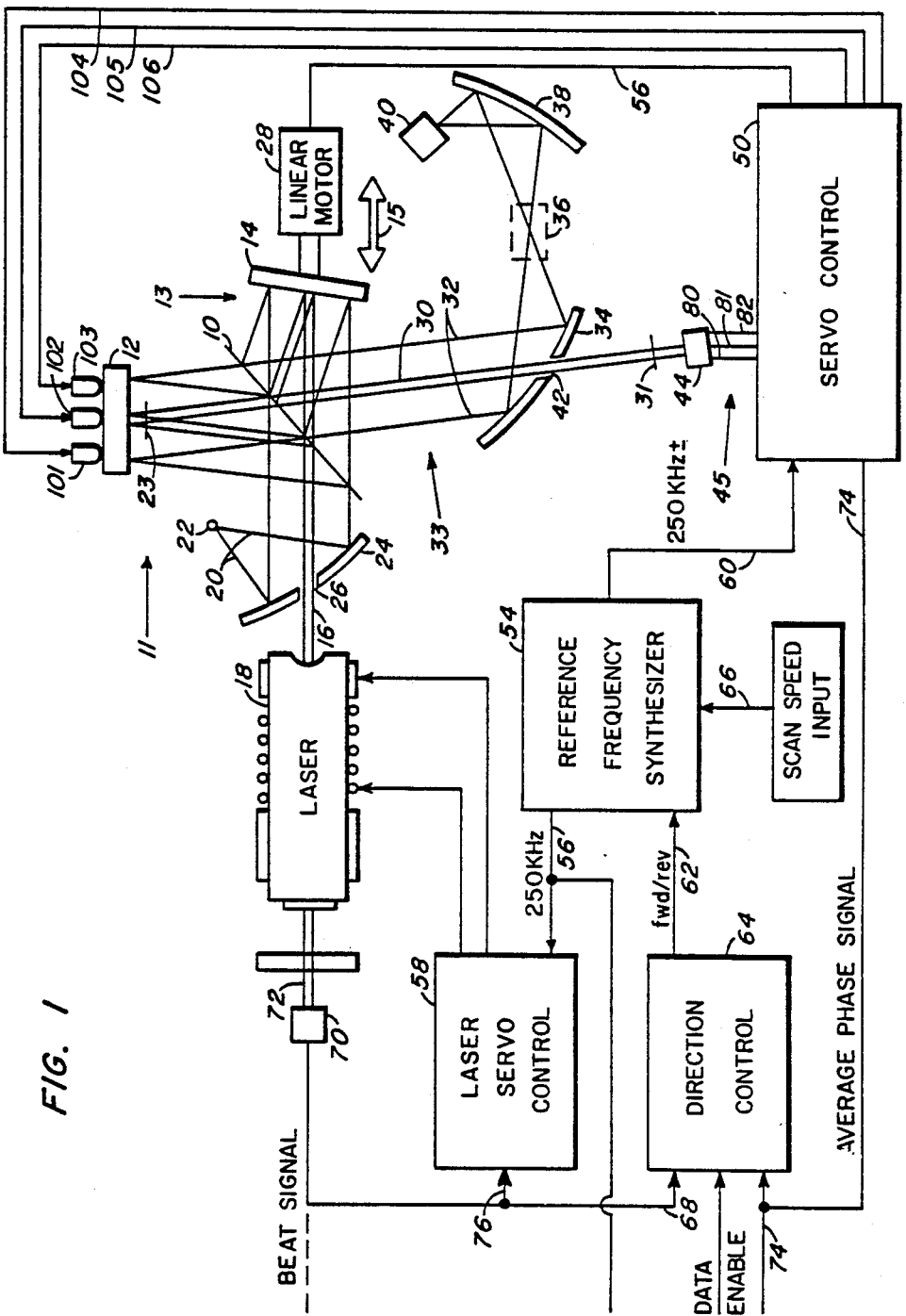
FIG. 1 is a schematic drawing of an interferometric portion of a Fourier transform infrared spectrophotometer and the control circuit which comprises the present invention.

The interferometric portion of the Fourier transform infrared (FT-IR) spectrophotometer is described with reference to FIG. 1. A Michelson interferometer is depicted which comprises a beam splitter 10 positioned to distribute a portion of an incident light beam along each of two perpendicular optical paths 11 and 13. The beam splitter 10 receives a laser beam 16 from a magnetically influenced laser 18, and an infrared light beam, shown bounded by lines 20, generated by an infrared light source 22. Generally, the infrared beam 20 is reflected and collimated by a non-planar mirror 24 for entry into the interferometer, while the laser beam 16 is directly applied to the beam splitter 10 through an opening 26 centrally located in the mirror 24.

The beam splitter 10 reflects a first portion of each beam 16 and 20, along the first fixed length optical path 11, which is bounded by an adjustable mirror 12. The light beams 16 and 20 are reflected by the mirror 12 to return along the optical path 11 to the beam splitter 10. A second portion of each of the light beams 16 and 20 is passed through the beam splitter 10 along the second optical path 13 which is bounded by a movable mirror 14. The movable mirror 14 is longitudinally movable with respect to the optical path 13, to change the length of the optical path within the selected scan range, indicated by arrow 15.

The second portions of each of the light beams 16 and 20 are reflected from the movable mirror to return along optical path 13 to the beam splitter 10, where they are recombined with the first portions of the light beams 16 and 20 returning along the first optical path 11. The recombined portions of the laser beam 16 form a heterodyne beam 30. The light beam 30 contains information of the alignment of the fixed mirror 12 relative to the movable mirror 14, through intensity modulation caused by interference phenomena. The recombined portions of infrared beam 20 form a heterodyned beam 32 which has each individual frequency modulated at a characteristic rate to provide a range of modulated frequencies of infrared light which can be applied to the sample material under analysis.

The recombined laser and infrared beams, 30 and 32, respectively, are directed along an exit path 33 of the interferometer in which a reflector 34 similar to reflector 24, is positioned. The reflector 34 receives the collimated infrared heterodyne beam 32 and reflects and focuses the beam on a sample chamber 36. The infrared beam 32 passes through the sample chamber 36 and reflects from a third mirror 38 to focus on an infrared photodetector 40. The photodetector 40 receives the amplitude modulated infrared beam which is modified by the sample material through which it passes. The photodetector 40 produces an electrical information signal proportional to the modified modulation of the beam which is used to generate an interferogram.

The modulated laser beam 30 passes from the interferometer through an opening 42 in the mirror 34. Beam 30 is directed to a detector 44. Preferably, the detector 44 comprises an array of photodetectors for measuring the intensity of the modulated laser beam 30 at selected varying points in its cross section. Electrical signals 45 produced by detector 44 are used to obtain correction of mirror misalignment. The signals 45 are applied to a parallelism servo control 50 to produce correction signals 53.

The correction signals 53 are applied to a plurality of piezoelectric elements 101, 102 and 103 which mount the adjustable mirror 12 to the interferometer framework, to control alignment of the mirrors 12 and 14.

Figure 2:
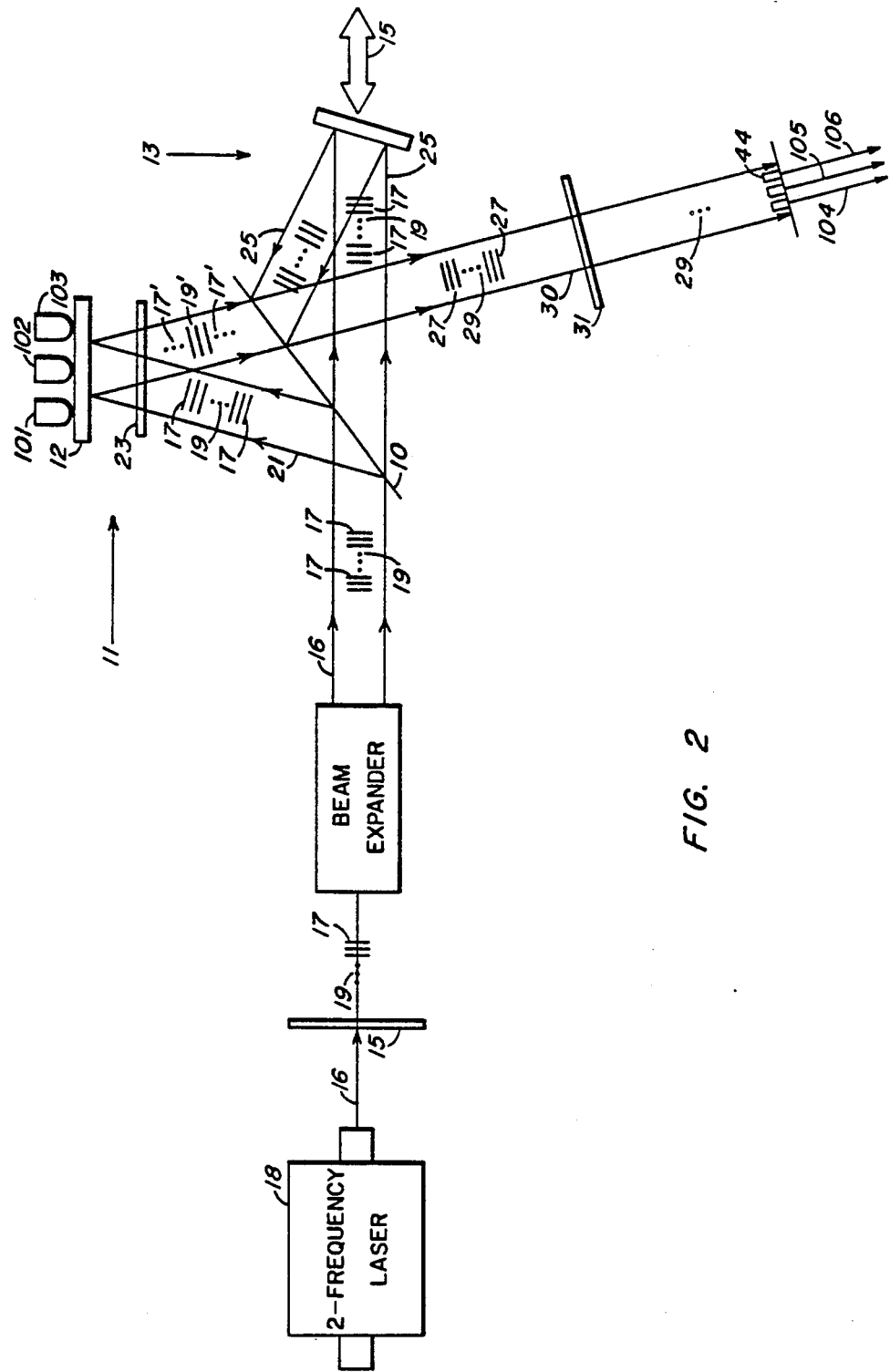
FIG. 2 is a schematic representation of the interferometric portion of the spectrophotometer depicting the polarization relationship of the individual component of the two-frequency laser as the laser beam passes through the interferometer.

The He-Ne laser 10 is magnetically influenced to produce a laser beam with two different frequency components, each having opposing circular polarization. The differing frequencies and polarizations are used to obtain a continuous flow of information in the heterodyne beam 30 leaving the interferometer. Referring to FIG. 2, the laser beam 16 having two component frequencies is passed through a quarter waveplate 15 before entering the interferometer. The quarter waveplate 15 converts each of the circularly polarized components into a linearly polarized component. One linearly polarized component exists in a plane parallel with the drawing, as shown by the bars 17 and has a frequency $f_1$. The other linear component exists in a plane perpendicular to the drawing, as shown by the dots 19 and has a frequency $f_2$. This is due to the opposing nature of the circular polarization the incident components exhibit. Thus, the light beam directed into the interferometer consists of two components each having an individual frequency and polarization making them clearly distinguishable from one another.

The first portion 21 of the laser beam 16 reflected along the fixed length optical path 11 passes through a second quarter waveplate 23, reflects from the adjustable mirror 12, and again passes through the quarter waveplate 23 in returning to the beam splitter 10. Passing the first portion 21 of the beam 16 twice through the quarter waveplate 23 acts to rotate the polarization of each component of the beam through a 90° angle about the axis of the beam. Thus, the first component 17 which was vertically polarized upon entering the fixed optical path 11 returns to the beam splitter 10 with a horizontal polarization as shown by bars 17'. Similarly, the second component having a horizontal polarization entering the fixed length optical path 11 returns to the beam splitter 10 with a vertical polarization, shown by dots 19'.

The second portion 25 of the laser beam which passes through the beam splitter 10 and along optical path 13 is reflected from the moving mirror 14 without change in polarization. Each of the components of the second portion 25 of the laser beam may, however, be changed in frequency by a value $\Delta f$. This is caused by a Doppler effect produced in the beam by movement of the movable mirror 14.

Since only like polarized beams will combine, upon returning the to the beam splitter 10, the component of the laser beam having frequency $f_1$ which has traversed the first optical path 11, and which has been rotated in polarization by 90°, will recombine with the component of the laser beam having a frequency $f_2 \pm \Delta f$ which has traversed the second optical path without change in polarization. A resulting recombined wave of one polarization 27 will thus exhibit a frequency of $f_1 - (f_2 \pm \Delta f)$. The resulting recombined wave of the other polarization 29 will exhibit a frequency of $f_1 \pm \Delta f) - f_2$. The recombined waves 27 and 29 are then directed from the interferometer through a polarizer plate 31 which filters out one of the two polarized waves. Thus, the detector 44 will receive a light beam having linear polarization in only one plane, and having a frequency which is intensity modulated by the combination of the differing frequency components of the laser beam, one of which may have a Doppler shift in frequency $\Delta f$ introduced.

It should be noted that a Doppler shift $\Delta f$ is introduced to the frequency of each of the components only when the movable mirror 14 is moving. When the movable mirror 14 is held stationary, no Doppler effect is generated. Thus, when the mirror 14 is stationary, the beam component traversing the first optical path 11 will recombine in the beam splitter 10 with the opposing component traversing the second optical path 13 to yield a heterodyne beam which exhibits a modulation or beat frequency exactly equal to the difference between the component frequencies, i.e., $f_1 - f_2$. Thus, the detector will continually receive a wave having a frequency modulation to determine whether the mirrors are in alignment.

Due to the continual modulation or beat frequency exhibited by the exiting light beam, an information signal will be produced which permits control of mirror alignment throughout the range of scan and in forward and rearward directions of scan.

The mirror alignment control system is described with reference returned to FIG. 1. The laser beam detector 44 comprises an array of photodetectors which measure the intensity of the laser beam 30 leaving the interferometer. The detector array 44 consists of at least three detectors positioned at three different locations in the beam cross section. The signals produced by the photodetectors provide an indication of the intensity difference across the cross section of the beam, which is proportional to the phase difference across the cross section of the beam. A difference in phase across the beam is directly related to misalignment of the moving mirror 14 with the projected image of the adjustable mirror 12. This is reasoned in that a coherent beam entering the interferometer will be changed in phase if the beam traverses unequal length paths, from one side of its width to the other. Misalignment is the result of non-parallel or angular relationship between the surface of one mirror with the reflected imaage of the surface of another. The angular relationship will cause a difference in path length across the width of the laser beam 16, resulting in a phase change across the laser beam cross section after it has traversed the interferometer path. If the mirrors are out of alignment by as much as a fraction of the wavelength of the laser beam, a phase change will be introduced across the beam. This phase change is measurable by determining the difference of intensity across the beam, and can be used as a sensed parameter in parallel alignment of the mirrors.

The adjustable mirror 12 is mounted to the base of the interferometer (not shown) by three electrostrictive elements, such as piezoelectric transducers 101, 102 and 103. The piezoelectric transducers are responsive to a voltage signal to change in length. The piezoelectric transducers are positioned between the mirror and the interferometer base in an arrangement similar to the arrangement of the detector array 44, so that each piezo transducer is relatable to a corresponding photodetector.

Preferably, piezo transducers 101, 102, and 103 and the photodetectors of detector array 44 are positioned in a circular manner equidistant from the center of the mirror and the center of the laser beam 30, respectively, and equidistant from one another. In this relationship a piezo transducer will be proportionally responsive to an individual detector detecting the laser beam 30, due to a similar positioning within the beam path.

A signal produced by an individual detector can be applied to a corresponding piezo transducer to increase or decrease the length of the path to which the transducer is responsive. With all the piezo transducers cooperating, an equal path length across the beam width can be continually obtained, indicating parallel alignment of the moving mirror.

The piezo transducers as descried are available from the Vernitron Co., as Part No. 16-8031-5H.

Figure 3:
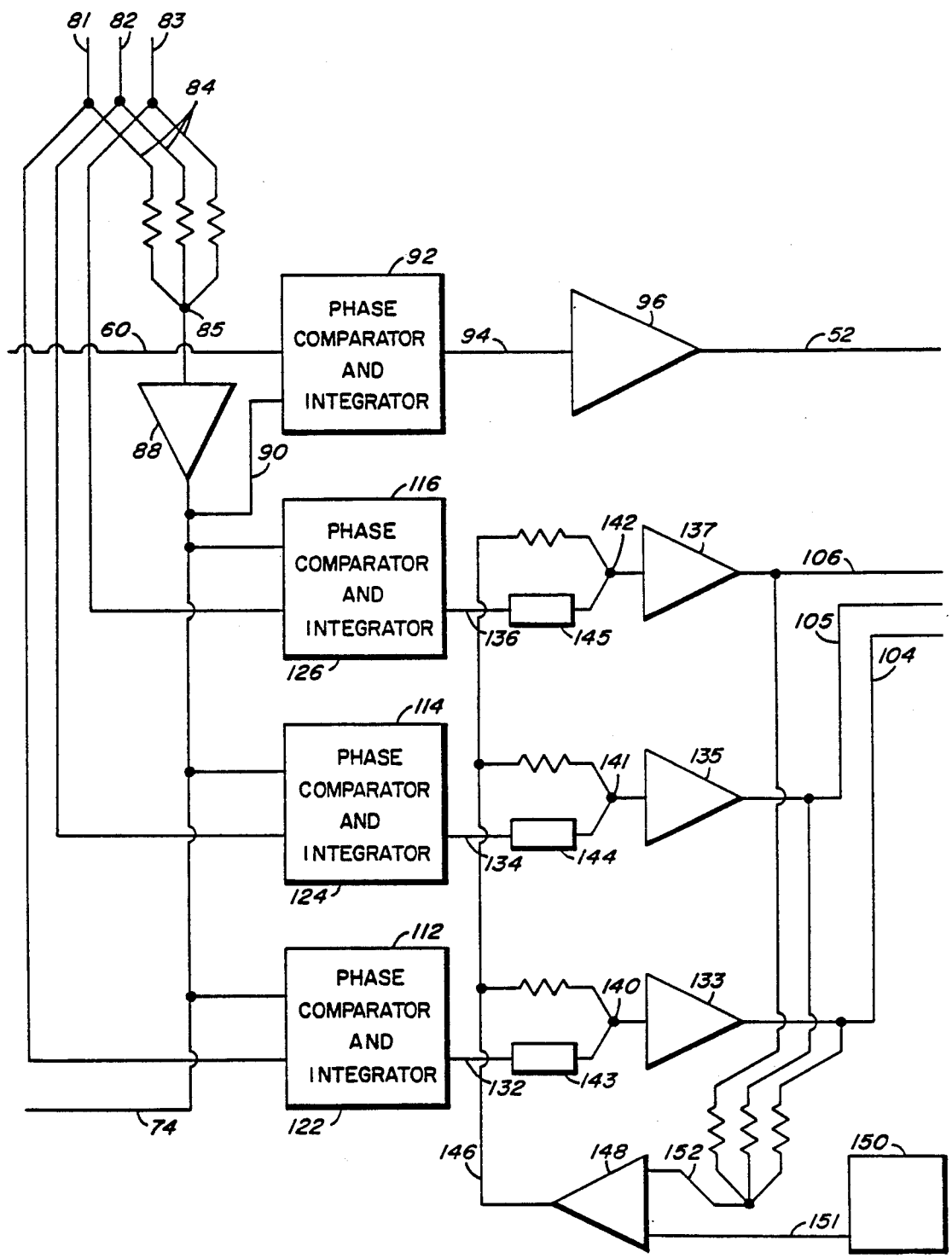
FIG. 3 is a schematic of the electrical circuit of a first mode of the scan and parallelism servo control.

The parallelism servo control circuit which processes the signals produced by the detector array 44 to generate correction signals 104, 105 and 106 is presented in FIG. 3. The parallelism servo control 50 receives three electrical signals 80, 81 and 82 produced by the photodetectors of detector array 44 in response to intensity fluctuations exhibited by the heterodyned laser beam 30. Each of the electrical signal 80, 81 and 82 indicates the relative phase of a portion of the heterodyne beam 30 leaving the laser. The signals 80–82 are passed through resistors 84 and summed at summing node 86. The summed signal from node 86 is applied to an operational amplifier 88 which produces a signal proportional to the average phase of the three signals 80–82. This signal shall be termed the average phase signal 90. The average phase signal 90 possesses a phase equal to the average of the phases of the individual signals 80–82.

The average phase signal 90 is applied to each of three phase comparators 112, 114 and 116. Each of the phase comparators 112, 114, and 116 also receives one of the individual signals 80, 81 and 82, respectively, produced by a photodetector in the detector array 44.

Each of the individual phase signals 80–82 is compared in phase with the average phase signal 90 by a phase comparator to produce an output signal which is proportional to the difference in phase between each individual signal with their summed average. Thus, signal 80 is compared in phase with average phase signal 90 by phase comparator 112, to obtain output signal 122 indicating the phase difference between them. Signal 81 is compared in phase with average phase signal 90 by phase comparator 114 to obtain output signal 124 indicating the phase difference between them. And signal 82 is compared in phase with average phase signal 90 by phase comparator 116 to obtain output signal 126 indicating the phase difference between them.

The phase comparators 112, 114 and 116 are commercially available devices manufactured by Motorola, Inc. and available as Part No. MC14046B. Further information regarding the phase comparator may be obtained from Motorola Publication CMOS Data Book on page 7-124.

The output signals 122, 124, 126 of each phase comparator 112, 114 or 116, respectively, is a voltage signal whose duration is proportional to the difference in phase between the individual phase of each of the signals 80-82 and the average phase signal 90 which provides a reference. Each of these output signals thus indicates the instantaneous correction required to bring the corresponding portion of the light beam path into phase with the average of the others. This measurement directly relates to the change in distance required of the interferometer path to make the path equal for all portions of the laser beam.

The output 122, 124 and 126 of each phase comparator 112, 114 and 116, is supplied to an integrator circuit to obtain control signals 132, 134 and 136, respectively, which are proportional to the time integral of the phase difference found between each of the individual signals and the average phase signal. Thus, each control signal 132, 134 and 136 is proportional to the time integral of the path length error (i.e., actual path length traversed vs. average path length) of that portion of the interferometer path traversed by the portion of the laser beam detected. Each of the control signals 132m 134 and 136 will be adjusted incrementally corresponding to greater or lesser path length error.

The integrator circuit may be comprised, for example, of a low pass filter network selected to match the frequency response characteristics of the other elements in the servo loop, as known in standard phase lock loop technology. Further information on integrator circuit designs applicable to this invention is discussed in the Motorola CMOS Data Book, previously cited.

The output of each phase comparator and integrator is applied to a summing node 140, 141, 142 through a filter 143, 144, 145 to remove noise from the signal. Each of the output signals 132, 134, 136 are summed with an output signal 146 from a differential amplifier 148. The output signal 146 of the differential amplifier 148 provides a reference signal to drive each of the piezo transducer elements 101, 102, 103 to the center of the longitudinal range of movement. This allows each of the piezo transducers to provide both lengthening and shortening correction to the optical path of the interferometer, depending upon the control signal applied.

Operational amplifiers 133, 135, 137 receive the output signals 132, 134, 136, respectively, with signal 146 from the differential amplifier 148 to produce a correction signal proportional to the difference in phase between the average phase signal and the individually measured phase signals. These signals 104, 105, 106 are applied to the piezo transducers 101, 102 and 103 mounting the adjustable mirror 12, to obtain an increase or decrease in their length, thereby adjusting the reflecting surface of the adjustable mirror 12. Adjustment of the surface of mirror 12 relative to the optical path 11 results in adjustment of the image of the surface of mirror 12 with the reflecting surface of the movable mirror 14.

The differential amplifier output 146 is generated in response to a reference voltage signal 151 received from a reference voltage source 150 and a signal 152 proportional to the average of the individual correction signals 104, 105, 106 applied to the piezo transducers 101, 102, 103.

The differential amplifier 148 compares the average signal 152 to the reference voltage signal 151. If the average signal 152 has a lower voltage than the reference signal, differential amplifier 148 increases the voltage of its output signal 146. If the average signal 152 has a greater voltage than the reference signal, differential amplifier 148 decreases the voltage of its output signal 146. Since the output signal 146 of differential amplifier 148 is fed into each of the operational amplifiers 133, 135 and 137 to produce a correction signal to which the differential amplifier 148 responds, a secondary control loop is formed. The differential amplifier 148 will drive the correction signals 104, 105, 106 upward or downwardly in voltage to obtain an average voltage of the signals 104, 105, 106 equal to the voltage of reference signal 151 which indicates the range center of the piezo element.

The reference voltage is selected at a value required which tends to bring each piezo transducer to the center of its longitudinal range of movement. The reference voltage selected is 175 volts, which corresponds to the center range voltage required of the piezo transducers 101, 102, 103 described. Thus, the differential amplifier provides a control signal to the input of each operational amplifier to adjust each of the piezo elements to the center of the its linear range, while each phase comparator and integrator provides a control signal corresponding to the change in length required of each corresponding piezo transducer to correct mirror alignment.

What is claimed is:

1. A closed loop servo control for dynamically aligning mirrors of an interferometer used for spectroscopic measurements, comprising:

means for producing a laser beam having a plurality of light frequencies which are heterodyned through the interferometer to obtain a continuous and constant intensity modulation of a select frequency usable to indicate the distance between the surface of a first mirror in the interferometer and a reflected image of the surface of a second mirror in the interferometer;

detector means for detecting said continuous intensity modulation in said laser beam to obtain a plurality of electrical signals each having a frequency characteristic of said intensity modulation frequency and of a modified intensity modulation when either said first or second mirror is moved relative to the other at selected locations in a cross section of said laser beam;

control means for comparing the phase of signal frequency of each of the plurality of electrical signals with the average of their phase, to obtain a plurality of correction signals, each of said correction signals indicating a correction in distance required between a portion of the surface of the first mirror and a corresponding portion of the image of the surface of the second mirror to bring said first mirror and said image into parallel alignment; and a plurality of adjusting means mounting one of said mirrors and responsive to said correction signals for changing the alignment between said controllably separating the surface of said first mirror and the image of the surface of said second mirror.

2. The closed loop servo of claim 1 wherein said detector means comprises a detector array having a plurality of photodetectors positioned at selected locations in the cross section of the laser beam, to receive selected light rays for phase comparison.

3. The closed loop servo control of claim 2 wherein said adjustment means comprises a plurality of controlled adjustable length elements for mounting one of said mirrors of said interferometer, each of said elements positioned to correspond with a photodetector of said detector means to provide adjustment in response to the correction signal generated from the respective electrical signal said related photodetector produces.

4. The closed loop servo control of claim 3 wherein said adjustable length elements are piezoelectric transducers responsive to a voltage signal to adjust in length.

5. The closed loop servo control of claim 1 wherein said means for producing said laser beam comprises a laser and means for generating a magnetic field applied to said laser to effect Zeeman splitting phenomenon in the laser beam generated by said laser so that said laser beam exhibits a plurality of light frequencies which heterodyne to continually produce an intensity beat characteristic in said beam.

6. A closed loop servo control for equalizing the difference in path length of all rays in a laser beam passing through differing length optical paths in an interferometer, comprising:
 means for producing a single laser beam having a plurality of light frequencies which are heterodyned through the interferometer to obtain a continuous and constant intensity modulation with a measurable frequency and directing said single laser beam through said inteferometer;
 a plurality of photodetectors each positioned at a difference location in a cross section of the laser beam exiting the interferometer to receive a select group of rays in said beam and generate an electrical signal having a frequency indicative of the intensity modulation frequency of the group of rays received by the detector;
 signal comparator means comparing each electrical signal with the other electrical signals for continuously generating a plurality of correction signals each indicative of a difference in modulation frequency between the compared electrical signals; and
 means responsive to the correction signals for moving an optical element in said interferometer to correct differences in ray path lengths indicated by the correction signals to equalize ray path lengths for the laser beam.

7. A closed loop servo control for dynamically aligning mirrors of an interferometer used for spectroscopic measurements, comprising:
 means producing a laser beam having a plurality of light frequencies which are heterodyned through the interferometer to obtain a continuous and constant intensity modulation of a select frequency usable to indicate the distance between corresponding portions of the surface of a first mirror bounding a substantially fixed length optical path in the interferometer and the surface of a second movable mirror bounding a changeable length optical path in the interferometer;
 detector means for detecting said continuous intensity modulation in said laser beam to obtain a plurality of electrical signals each having a frequency characteristic of said intensity modulation frequency and of a modified intensity modulation when the movable mirror is scanned at selected locations in a cross section of said laser beam;
 control means for comparing the phase of signal frequency of each of the plurality of electrical signals with the average of their phase, to obtain a plurality of correction signals, each of said correction signals indicating a correction in distance required between a portion of the surface of the first mirror and a corresponding portion of the surface of the second mirror to bring said first and second mirrors into parallel alignment; and
 a plurality of adjusting means mounting one of said mirrors and responsive to said correction signals for changing the alignment between and controllably separating the surface of said first mirror and the image of the surface of said second mirror.

8. The closed loop servo of claim 7 wherein said detector means comprises a detector array having a plurality of photodetectors positions at selected locations in the cross section of the laser beam, to receive selected light rays for phase comparison.

9. The closed loop servo control of claim 8 wherein said adjustment means comprises a plurality of adjustable length elements for mounting a mirror, each of said elements positioned to correspond with a photodetector of said detector means to provide adjustment in response to the signal said related photodetector produces.

10. The closed loop servo control of claim 9 wherein said adjustable length elements are piezoelectric transducers responsive to a voltage signal to adjust in length.

11. The closed loop servo control of claim 7 wherein said means for producing said laser beam comprises a laser and means for generating a magnetic field applied to said laser to effect Zeeman splitting phenomenon in the laser beam generated by said laser so that said laser beam exhibits a plurality of light frequencies which heterodyne to continually produce an intensity beat characteristic in said beam.

12. A closed loop servo control for equalizing the difference in path length of all rays in a laser beam passing through differing length optical paths an interferometer, comprising:
 means for producing a single laser output beam having a plurality of light frequencies which are heterodyned through the interferometer to obtain a continuous and constant intensity modulation with a measurable frequency and directing said single laser beam through said interferometer frequency;
 a plurality of photodetectors each positioned at a different location in a cross section of the laser beam exiting the interferometer to receive a select group of rays in the beam and generate an electrical signal having a frequency indicative of the intensity modulation frequency of the group of rays received by the detector;
 signal comparator means comparing each electrical signal with an average thereof for continuously generating a plurality of correction signals each indicative of a difference in the modulation frequencies of the electrical signals and their average compared therewith; and
 means responsive to the correction signals for moving an optical element in said interferometer to correct differences in ray path lengths indicated by the correction signals to equalize ray path length for the laser beam.

* * * * *